United States Patent
Veal et al.

(10) Patent No.: US 7,836,195 B2
(45) Date of Patent: Nov. 16, 2010

(54) PRESERVING PACKET ORDER WHEN MIGRATING NETWORK FLOWS BETWEEN CORES

(75) Inventors: Bryan Veal, Hillsboro, OR (US); Annie Foong, Aloha, OR (US)

(73) Assignee: Intel Corporation, Santa Clara, CA (US)

(*) Notice: Subject to any disclaimer, the term of this patent is extended or adjusted under 35 U.S.C. 154(b) by 207 days.

(21) Appl. No.: 12/072,604

(22) Filed: Feb. 27, 2008

(65) Prior Publication Data

US 2009/0213732 A1    Aug. 27, 2009

(51) Int. Cl.
    G06F 15/16    (2006.01)
(52) U.S. Cl. .................. 709/231; 709/203; 709/245; 370/412; 370/413; 370/415; 370/428; 370/429
(58) Field of Classification Search .............. 709/234, 709/235, 250, 231, 245; 370/412, 413, 415, 370/419, 428, 429
    See application file for complete search history.

(56) References Cited

U.S. PATENT DOCUMENTS

| | | | | |
|---|---|---|---|---|
| 6,032,207 A | * | 2/2000 | Wilson | 710/54 |
| 7,664,823 B1 | * | 2/2010 | Wakerly | 709/211 |
| 2001/0034867 A1 | * | 10/2001 | Jaffe et al. | 714/746 |
| 2006/0173885 A1 | * | 8/2006 | Moir et al. | 707/101 |
| 2007/0079071 A1 | * | 4/2007 | Saha et al. | 711/118 |
| 2007/0214167 A1 | * | 9/2007 | Nair et al. | 707/101 |
| 2008/0069114 A1 | * | 3/2008 | Shimada | 370/395.31 |
| 2008/0275989 A1 | * | 11/2008 | Ebersole et al. | 709/225 |
| 2009/0034549 A1 | * | 2/2009 | Soni et al. | 370/412 |

OTHER PUBLICATIONS

Windows Hardware and Driver Central, "Scalable Networking: Eliminating the Receive Processing Bottleneck—Introducing RSS," WinHEC 2004 Version—Apr. 14, 2004, pp. 1-17.
U.S. Appl. No. 11/864,276, filed Sep. 28, 2007, entitled "Notification of Out of Order Packets," by Annie Foong, et al.
U.S. Appl. No. 11/771,250, filed Jun. 29, 2007, entitled "Adaptive Receive Side Scaling," by Bryan E. Veal, et al.
U.S. Appl. No. 11/539,510, filed Oct. 6, 2006, entitled "Network Interface Techniques," by Annie Foong, et al.

* cited by examiner

*Primary Examiner*—Thuong T Nguyen
(74) *Attorney, Agent, or Firm*—Trop, Prunner & Hu, P.C.

(57) ABSTRACT

In one embodiment, the present invention includes a method for receiving a first packet associated with a first network flow in a first descriptor queue associated with a first hardware thread, receiving a marker in the first descriptor queue to indicate migration of the first network flow from the first hardware thread to a second hardware thread, and processing a second packet of the first network flow following the first packet in order in the second hardware thread.

10 Claims, 3 Drawing Sheets

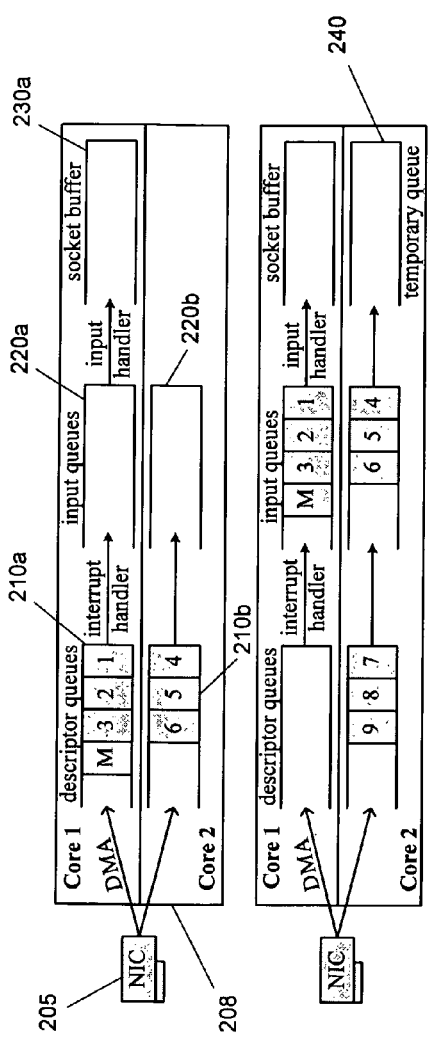
FIG. 2A
FIG. 2B
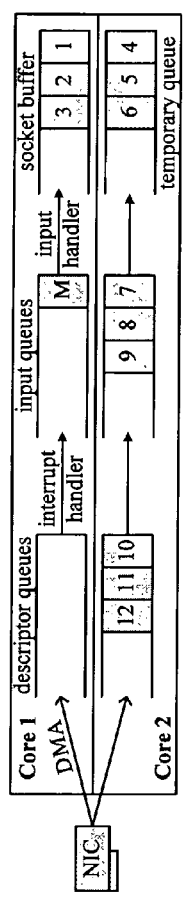
FIG. 2C
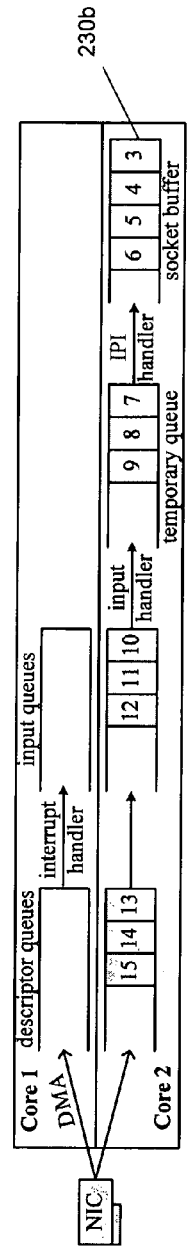
FIG. 2D
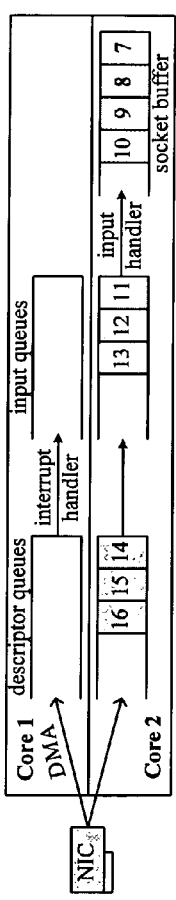
FIG. 2E

PRESERVING PACKET ORDER WHEN MIGRATING NETWORK FLOWS BETWEEN CORES

BACKGROUND

In network communications, typically a network interface controller (NIC) or other network adapter is present within a system to receive incoming packets from the network. The number of incoming packets can be very large. Thus as the number of cores present in a system continues to increase, technologies such as Receive-Side Scaling (RSS) make it possible to spread network flows among the cores to maintain scalability. Rebalancing the system load can cause network flows to migrate from core to core, which can cause their packets to be processed out of order. Networking protocols such as transmission control protocol (TCP) are designed to handle out-of-order packets correctly, but system performance is reduced as a result. Accordingly, RSS currently uses migration only when processor load is extremely unbalanced.

Some load balancing schemes attempt to prevent packet reordering by only migrating during gaps between bursts. While preserving order is more likely with this technique, a general-purpose operating system (OS) cannot provide a minimum duration of the gap to guarantee that reordering is prevented. Furthermore, while a burst-gap pattern is common in network flows, this behavior is not guaranteed.

BRIEF DESCRIPTION OF THE DRAWINGS

FIGS. 2A-2E are a representative example of a core-to-core migration of a network flow in accordance with an embodiment of the present invention.

DETAILED DESCRIPTION

In various embodiments, to avoid reordering of packets of a network flow, a network adapter such as a NIC may notify a network protocol handler of an OS as to a flow's migration events by inserting a special marker into a descriptor queue associated with a given core, or any other type of hardware thread, from which a flow is to be migrated. A handler or driver inserts the marker into a network input queue along with the other packets of the flow. A network queue handler holds incoming packets on new cores until the old core receives the marker instructing it to migrate flows. Since packets on the new core remain queued until the old core receives the marker, order is preserved.

Figure 1:
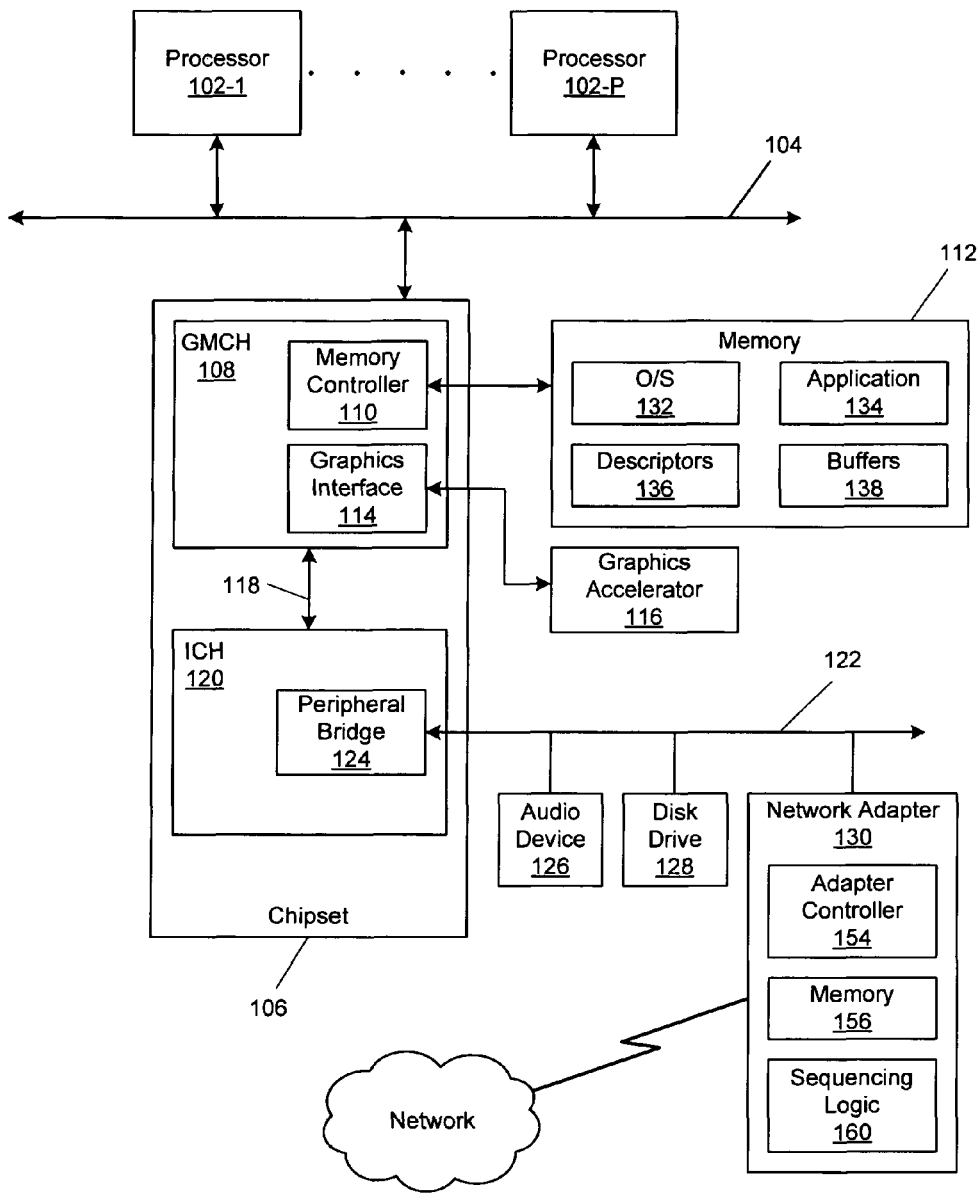
FIG. 1 illustrates a block diagram of a computing system in accordance with an embodiment of the invention.

FIG. 1 illustrates a block diagram of a computing system 100 in accordance with an embodiment of the invention. The computing system 100 may include one or more central processing unit(s) (CPUs) or processors 102-1 through 102-P (which may be referred to herein as "processors 102" or "processor 102"). The processors 102 may communicate via an interconnection network (or bus) 104. The processors 102 may include a general purpose processor, a network processor (that processes data communicated over the computer network), or other types of a processor (including a reduced instruction set computer (RISC) processor or a complex instruction set computer (CISC)). The processors 102 may include one or more chip-level multithreading (CMT) hardware threads, including chip-level multiprocessing (CMP) cores, interleaved multithreading threads, simultaneous multithreading (SMT) threads, other hardware threads, or any combination thereof, which may be embodied on a single semiconductor die. In an embodiment, various operations discussed herein may be performed by one or more components of the system 100.

A chipset 106 may also communicate with the interconnection network 104. The chipset 106 may include a graphics memory control hub (GMCH) 108. The GMCH 108 may include a memory controller 110 that communicates with a main system memory 112. The memory 112 may store data, including sequences of instructions that are executed by the processor 102, or any other device included in the computing system 100. In one embodiment, the memory 112 may include one or more storage devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 104, such as multiple CPUs and/or multiple system memories.

The GMCH 108 may also include a graphics interface 114 that communicates with a graphics accelerator 116. In one embodiment, the graphics interface 114 may communicate with the graphics accelerator 116 via an accelerated graphics port (AGP). In an embodiment of the invention, a display (such as a flat panel display, a cathode ray tube (CRT), a projection screen, etc.) may communicate with the graphics interface 114 through, for example, a signal converter.

A hub interface 118 may allow the GMCH 108 and an input/output control hub (ICH) 120 to communicate. The ICH 120 may provide an interface to I/O devices that communicate with the computing system 100. The ICH 120 may communicate with a bus 122 through a peripheral bridge (or controller) 124, such as a peripheral component interconnect (PCI) bridge, a universal serial bus (USB) controller, or other types of peripheral bridges or controllers. The bridge 124 may provide a data path between the processor 102 and peripheral devices. Other types of topologies may be utilized. Also, multiple buses may communicate with the ICH 120, e.g., through multiple bridges or controllers. Moreover, other peripherals in communication with the ICH 120 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 122 may communicate with an audio device 126, one or more disk drive(s) 128, and one or more network interface device(s) 130 such as a network adapter (which is in communication with a computer network). A "network interface" as referred to herein relates to a device which may be coupled to a communication medium to transmit data to and/or receive data from other devices coupled to the communication medium, i.e., to send and receive network traffic. For example, a network interface may transmit packets to and/or receive packets from devices coupled to a network such as a local area network. Such a network interface 130 may communicate with other devices according to any one of several data communication formats such as, for example, communication formats according to versions of Institute of Electrical and Electronics Engineers (IEEE) Standard (Std.) 802.3 (CSMA/CD Access Method, 2002 Edition); IEEE Std. 802.11 (LAN/MAN Wireless LANS, 1999 Edition), IEEE Std. 802.16 (2003 and 2004 Editions, LAN/MAN Broadband Wireless LANS), Universal Serial Bus, Firewire, asynchronous transfer mode (ATM), synchronous optical network (SONET) or synchronous digital hierarchy (SDH) standards. In an embodiment, the network interface device 130 may be a NIC.

As illustrated in FIG. 1, the memory 112 may include one or more of an OS 132 or application(s) 134. The memory 112 may also store one or more device driver(s), packet buffers 138, descriptors 136 (which may point to the buffers 138 in some embodiments), network protocol stack(s), etc. to facilitate communication over the network. The application(s) 134 may execute (on the processor(s) 102) to communicate one or more packets with one or more computing devices coupled to the network (such as the devices 104-114 of FIG. 1). In an embodiment, a packet may be a sequence of one or more symbols and/or values that may be encoded by one or more electrical signals transmitted from at least one sender to at least one receiver (e.g., over a network). For example, each packet may include a header that includes various information, which may be utilized in routing and/or processing the packet, such as a source address, a destination address, packet type, etc. Each packet may also have a payload that includes the raw data (or content) the packet is transferring between various computing devices (e.g., the devices 104-114 of FIG. 1) over a computer network and may be TCP/IP packets.

In an embodiment, the application 134 may utilize the OS 132 to communicate with various components of the system 100, e.g., through a device driver (not shown). Hence, the device driver may include network adapter specific commands to provide a communication interface between the O/S 132 and the network adapter 130. Furthermore, in some embodiments, the network adapter 130 may include a (network) protocol layer for implementing the physical communication layer to send and receive network packets to and from remote devices over the network. The network may include any type of computer network such as those discussed with reference to FIG. 1. The network adapter 130 may further include a direct memory access (DMA) engine, which may write packets directly to buffers 138 assigned to available descriptors 136 in the memory 112 via a DMA channel. Additionally, the network adapter 130 may include a network adapter controller 154, which may include hardware (e.g., logic circuitry) and/or a programmable processor (such as the processors 102) to perform adapter related operations. In an embodiment, the adapter controller 154 may be a media access control (MAC) component. The network adapter 130 may further include a memory 156, such as any type of volatile/nonvolatile memory, and may include one or more cache(s).

As shown in FIG. 1, the network adapter 130 may include a sequencing logic 160 (which may be implemented as hardware, software, firmware, or some combination thereof) to assist in in-order processing of incoming packets while enabling core-to-core migration, as will be further discussed. In one embodiment, logic 160 may be optional and the adapter controller 154 may perform operations discussed herein with reference to the logic 160, such as the operations discussed with reference to FIG. 3. Also, the controller 154 may perform such operations in accordance with instructions stored in a storage device (such as the memory 112 and/or memory 156) in some embodiments.

Furthermore, the controller 154, processor(s) 102, and/or logic 160 may have access to a cache (not shown). Moreover, the cache may be a shared or private cache, e.g., including various levels such as one or more of a level 1 (L1) cache, a level 2 (L2) cache, a mid-level cache (MLC), or a last level cache (LLC). In some embodiments, the cache may be incorporated on the same IC chip as the controller 154, processor(s) 102, and/or logic 160.

To preserve packet order of a network flow during a core-to-core migration, a NIC or other network adapter may insert a marker into a current descriptor queue before migrating flows to another queue. Referring now to FIGS. 2A-2E, shown is a representative example of a core-to-core migration of a network flow in accordance with an embodiment of the present invention. As shown in FIG. 2A, a system 200 includes multiple cores, namely a first core and a second core, i.e., Core 1 and Core 2, which may be multiple cores of a single processor or cores of different processors. A NIC 205 is coupled to a memory 208, such as a DRAM. Such coupling may be direct or indirect through a chipset. Memory 208 may further be coupled to the cores themselves, either directly or through a chipset. NIC 205 provides incoming packets of network flows according to a DMA protocol, although the scope of the present invention is not limited in this regard. As shown in FIG. 2A, for example, each core can have a descriptor queue $210_a$-$210_b$ (generically descriptor queue 210) and an input queue $220_a$-$220_b$ (generically input queue 220) associated therewith. In various embodiments, descriptor queues 210 may be configured as ring buffers, although the scope of the present invention is not limited in this regard. Still further, a socket buffer $230_a$ is shown (in FIG. 2A). Socket buffer $230_a$ may be associated with a given application or other process running on a given core. A similar socket buffer $230_b$ may be associated with another such process, as shown in FIG. 2D for example. To handle the flow of packets, an OS interrupt handler, an input handler, as well as an inter-processor interrupt (IPI) handler may also be used, as discussed below. While shown with this particular implementation in the embodiment of FIGS. 2A-2E, the scope of the present invention is not limited in this regard.

FIG. 2A provides an example of a migration where three packets (i.e., packets 1-3) are sent to a first core, Core 1, followed by a marker M, and subsequent packets (i.e., packets 4-6) are sent to a second core, Core 2. While described herein as cores, in different implementations migrations may be between the most fine-grained view of CPUs available, whether they are hardware threads, cores, or processors. The marker contains sufficient information to identify all the flows which have migrated and the core to which they are migrating. For example, if the migration is caused by changing the target queue of an RSS indirection table entry, the NIC can include either a RSS hash value or a table entry identifier (ID) to identify the flow group. A flow group is defined as a collection of one or more network flows which migrate together but may be otherwise independent. Similarly, a core ID can be included in the marker to identify the core to which migration is to occur. Instead or in addition, a queue ID may also be included in the marker to identify the corresponding destination queue.

When the driver's interrupt handler on the old (i.e., first) core encounters the marker descriptor, it simply moves marker M from descriptor ring 210a to packet input queue 220a as if it were an ordinary packet descriptor. FIG. 2B shows packets along with marker M moving from descriptor queues 210 to their respective input queues 220. Note that the implementation shown in FIGS. 2A and 2B assumes that the OS has multiple input queues 220, each associated with and handled on a specific core. In some implementations, such as a Linux-based OS, for example, the marker data can be added to a special buffer and can be enqueued like a packet. Care may be taken to ensure that the marker is not lost if input queue 220 is full, otherwise network processing might deadlock. In some embodiments, input queue 220 may be allowed to overflow for markers, or packets can be dropped from queue 220 to make room for a marker.

A queue ID variable for each flow group may be used to denote which core is allowed to process the flow groups' packets. As the packet input handler removes packets from input queue 220, it uses this information to decide whether to send each packet to a socket buffer or temporary queue, and if to a temporary queue, which to use. Thus as the input handler dequeues packets, it compares the packet's flow-group's queue ID with the current queue. The input handler processes the flow group's packets so long as the queue ID matches, until a time when the input handler dequeues a marker instructing it to change the queue ID and switch processing to another core. The marker thus assures the input handler that no more packets for the flow group will arrive from the current input queue.

Meanwhile, the input handler on the destination core holds the packets of the migrated flows until the queue ID changes. Since packets for non-migrating flows (not shown in FIGS. 2A-2E) may be pending in the input queue of the destination core, the input handler moves the migrated packets to a temporary queue and continues processing such other packets. After receiving the corresponding marker from the input queue, the input handler on the source core changes the queue ID and then sends an inter-processor interrupt (IPI) to call a function on the destination core that processes all the packets in the temporary queue. Once the temporary queue is empty, the destination core can resume processing its input queue normally.

FIGS. 2C, 2D, and 2E show how the input handler accomplishes this migration. In FIG. 2C, the input handler reads packets from input queue 220a on Core 1, while the input handler puts packets into a temporary queue 240 associated with the packets' flow group and Core 2. A distinct temporary queue 240 may be associated with each flow group and core. That is, each flow group may have an associated temporary queue for each core. When the marker arrives on input queue 220a and is dequeued, the input handler switches the queue ID to Core 2. The input handler sends an IPI to Core 2. In FIG. 2D, an IPI handler processes packets from temporary queue 240 associated with the migrating flow group. Once empty, the input handler on Core 2 resumes processing packets, as shown in FIG. 2E.

Figure 3:
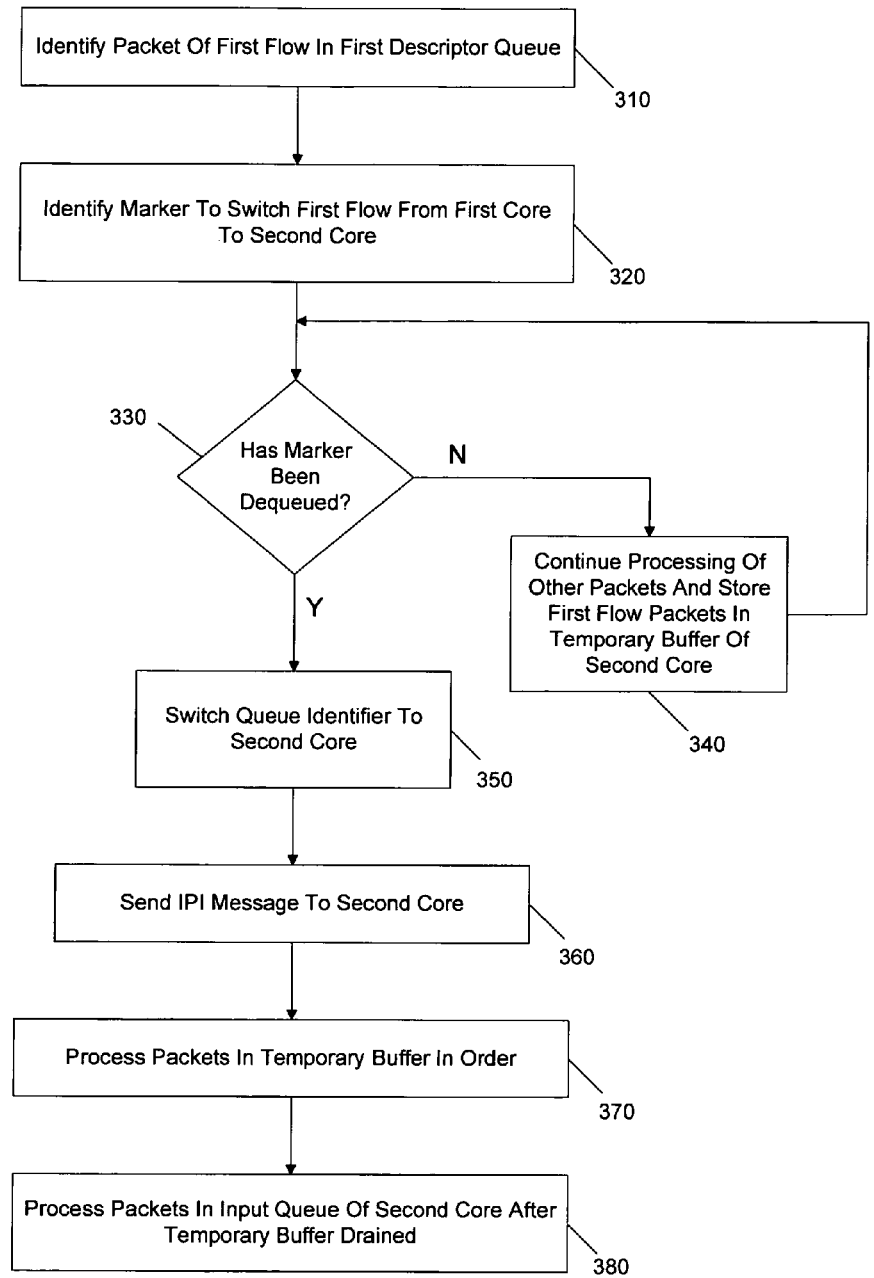
FIG. 3 is a flow diagram of a method in accordance with one embodiment of the present invention.

Referring now to FIG. 3, shown is a flow diagram of a method in accordance with an embodiment of the present invention. More specifically method 300 may be used to handle migration of a network flow between a first processor and a second processor in accordance with an embodiment of the present invention.

As shown in FIG. 3, method 300 may begin by identifying a packet of a first network flow in a first descriptor queue (block 310). That is, on receipt of a packet from a NIC, a descriptor may be identified in the first descriptor queue. This first descriptor queue may be associated with a first core of a multi-core processor, for example. At block 320, a marker is identified that includes information to cause a switch of the first flow from a first core to a second core. This marker is similarly stored in the first descriptor queue associated with the first core. While shown as separate actions, in some embodiments, the marker may be within a descriptor associated with another packet, rather than its own independent record.

Referring still to FIG. 3, next it may be determined whether this marker has been dequeued (diamond 330). For example, the marker may flow along with packets from the first descriptor queue via an interrupt handler and into an input queue, until it is dequeued by the input handler. If this marker has not yet been dequeued by the input handler, control passes to block 340, where the input handler can continue processing of other packets (i.e., prior to the marker and of other network flows). Still further, during this time packets of the first network flow may be incoming to a second descriptor queue associated with the second core (not shown in FIG. 3). Any such first flow packets that are dequeued from an input queue associated with the second core prior to dequeuing of the marker from the input queue of the first core may be stored in a temporary buffer associated with that second core (block 340).

Control passes back to diamond 330 to determine whether the marker has been dequeued. If so, control passes to block 350, where a queue identifier may be switched to the second core. More specifically, when the marker has been dequeued, the input handler causes a queue identifier to switch association to the second core. Still further, the input handler sends an IPI message to the second core (block 360). This message then causes initiation of an IPI handler that acts to wake up the second core for dequeuing operations with respect to the first flow packets that are present in the temporary buffer associated with the second core. Accordingly, the second core may process packets that are in the temporary buffer in order (block 370). Thus these packets are processed in order following the earlier packets of this first network flow that were processed on the first core. Finally, after this temporary buffer is drained, normal operations may continue such that packets present in the input queue associated with the second core may be processed (block 380). In this way, packets may continue to be handled in order even during a migration event from a first processor to a second processor. While shown with this particular implementation in the embodiment of FIG. 3, the scope of the present invention is not limited in this regard.

Embodiments thus avoid drawbacks of other methods that prevent reordering. For example, while the operating system could attempt to finish processing all packets of a flow before allowing migration, it can never be certain the NIC is not already sending a new packet to the old core. A race condition will always exist without assurance from the NIC that no more packets will arrive on the old core. This could be done by disabling the NIC's interrupts, but this would introduce an unnecessary delay in processing packets. Likewise, the network protocol could assume missing packets are always due to migration so that it delays processing while waiting for the packet on another core, but this would delay retransmission in the case of actual missing data. Another method to prevent reordering is to only migrate during gaps between packet bursts caused by TCP's self-clocking behavior. This method attempts to allow existing packets enough time to be processed completely before migrating. However, if a new packet arrives too soon, the migration does not occur. This requires estimation of how long it takes for a core to process a packet burst, but most operating systems provide no such real-time guarantees. Furthermore, although the burst-gap pattern is a common TCP property, it is not a guaranteed network condition.

Embodiments that use markers to enable migration while preventing reordering can be used with virtually any packet classification system, although RSS is described herein as an example. As long as the NIC can provide enough information in the marker to identify groups of flows and the destination core, the OS can handle the details of processing the migration with correct packet ordering.

Using markers also allows multiple successive migrations on any number of cores. For example, the NIC can send packets to cores in a round-robin manner and insert markers between them. The markers thus form a linked list, where each marker points to the queue on which to find the next marker.

Thus even in NICs that support increasing numbers of queues within platforms that contain an increasing number of cores, the NIC may preserve packet order to improve the performance of migrations. Such migration may be common in systems that execute workloads that incorporate load balancing, virtualization, and power provisioning.

Embodiments that preserve packet order are independent of the manner in which packets are classified into queues, as a NIC can identify which groups of flows have migrated to which queues. Embodiments thus can be added to current flow classification schemes such as RSS, since they do not alter their fundamental architecture and function. Likewise, future flow classification and queuing schemes can similarly use an embodiment of the present invention.

Thus a NIC or other input device can be designed to explicitly provide the driver and operating system with the necessary information to preserve data sequence during core-to-core migration of flows. As such, the driver and/or operating system can be designed to rely on information from the NIC or other input device to preserve order.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a network adapter to provide packets to a memory coupled to a processor including a first hardware thread and a second hardware thread, the memory including a first descriptor queue associated with the first hardware thread to store packets, a second descriptor queue associated with the second hardware thread to store packets, a first input queue to receive the packets from the first descriptor queue, and a second input queue to receive the packets from the second descriptor queue, the network adapter to insert a marker into the first descriptor queue to cause migration of a first network flow from the first hardware thread to the second hardware thread where the marker flows along with the packets from the first descriptor queue into the first input queue, while preserving packet order of the first network flow, the memory further including a temporary buffer associated with the second hardware thread to store packets of the first network flow from the second input queue after dequeuing of the packets from the second input queue and prior to dequeuing of the marker from the first input queue, and a socket buffer associated with a process running on the first hardware thread to store packets of the first network flow from the first input queue after dequeuing of the packets from the first input queue prior to the marker being dequeued from the first input queue, and wherein the network adapter is to include a hardware thread identifier and a queue identifier in the marker and to store the marker in the first descriptor queue using a direct memory access (DMA) channel.

2. The apparatus of claim 1, wherein the second hardware thread is to process at least one packet associated with a second network flow while the packets are stored in the temporary buffer and before the marker has been dequeued from the first input queue.

3. The apparatus of claim 2, further comprising an input handler to switch a queue identifier from the first descriptor queue to the second descriptor queue and send an inter-processor interrupt to the second hardware thread, to cause the second hardware thread to process the packets stored in the temporary buffer.

4. The apparatus of claim 3, further comprising an inter-processor interrupt handler to cause the second hardware thread to process the packets stored in the temporary buffer.

5. The apparatus of claim 1, wherein the network adapter is to store packets of the first network flow in the second descriptor queue after storing the marker in the first descriptor queue.

6. A method comprising:
providing packets to a memory coupled to a processor including a first hardware thread and a second hardware thread;
storing first packets of a first network flow in a first descriptor queue associated with the first hardware thread;
storing second packets of the first network flow in a second descriptor queue associated with the second hardware thread;
receiving the first packets from the first descriptor queue in a first input queue;
receiving the second packets from the second descriptor queue in a second input queue;
inserting and storing a marker into the first descriptor queue, via a network adapter using a direct memory access (DMA) channel, to cause migration of the first network flow from the first hardware thread to the second hardware thread where the marker flows along with the packets from the first descriptor queue into the first input queue while preserving packet order of the first network flow, wherein the marker includes a hardware thread identifier and a queue identifier;
storing the second packets of the first network flow in a temporary buffer associated with the second hardware thread after dequeuing from the second input queue when the marker has not yet been dequeued from the first input queue; and
storing the first packets of the first network flow after dequeuing from the first input queue in a socket buffer associated with a process running on the first hardware thread prior to dequeueing of the marker from the first input queue.

7. The method of claim 6, further comprising processing at least one packet associated with a second network flow while the packets are stored in the temporary buffer and before the marker has been dequeued from the first input queue.

8. The method of claim 7, further comprising switching a queue identifier from the first descriptor queue to the second descriptor queue and sending an inter-processor interrupt to the second hardware thread, to cause the second hardware thread to process the packets stored in the temporary buffer.

9. The method of claim 8, further comprising causing the second hardware thread to process the packets stored in the temporary buffer.

10. The method of claim 6, further comprising storing the second packets of the first network flow in the second descriptor queue after storing the marker in the first descriptor queue.

* * * * *